United States Patent [19]

Schrenk

[11] 3,977,153
[45] Aug. 31, 1976

[54] CONTAINER FOR FOOD PRODUCTS AND METHOD FOR MAKING SAME

[75] Inventor: Walter J. Schrenk, Bay City, Mich.

[73] Assignee: The Dow Chemical Company, Midland, Mich.

[22] Filed: July 1, 1974

[21] Appl. No.: 484,528

Related U.S. Application Data

[62] Division of Ser. No. 97,435, Nov. 6, 1970, abandoned.

[52] U.S. Cl. .................... 53/40; 156/69; 156/244; 156/247; 156/250; 156/254; 264/37; 264/92; 264/153; 264/248

[51] Int. Cl.² .................... B29D 9/00; B65B 7/00

[58] Field of Search .................... 264/37, 89, 90, 92, 264/171, 176 R, 322, 160, 88, 153, 248, 93; 156/69, 247, 243, 250, 254, 244; 229/3.5 R; 53/40, 42, 18, 14

[56] References Cited
UNITED STATES PATENTS

| | | |
|---|---|---|
| 3,402,873 | 9/1968 | Lauterbach .................... 156/69 |
| 3,449,479 | 6/1969 | Cines .................... 264/92 |
| 3,454,210 | 7/1969 | Spiegal et al. .................... 229/3.5 R |
| 3,524,795 | 8/1970 | Peterson .................... 264/171 |
| 3,619,444 | 11/1971 | Roth .................... 264/92 |
| 3,732,348 | 5/1973 | Ignell .................... 264/92 |
| 3,821,182 | 6/1974 | Baird et al. .................... 264/171 |

Primary Examiner—Willard E. Hoag
Attorney, Agent, or Firm—Arthur J. Young

[57] ABSTRACT

A plastic container for food products and method of making the container, the body of the container thermoformed from a sheet comprising a plurality of layers which are held together in a contiguous structure without being securely bonded together, said layers of the container body functionally secured in place after filling by an interlocking closure. At least one layer provides structural rigidity and a good water vapor barrier and at least one other layer provides a barrier to the transmission of oxygen and a supplementary water vapor barrier. The container is capable of withstanding retort temperatures. Separation of the scrap sheet from which the container body is formed and recycle of separate layer scrap from the container body thermoforming process can be accomplished since the layers forming the container body are not securely bonded together.

9 Claims, 4 Drawing Figures

U.S. Patent   Aug. 31, 1976   3,977,153
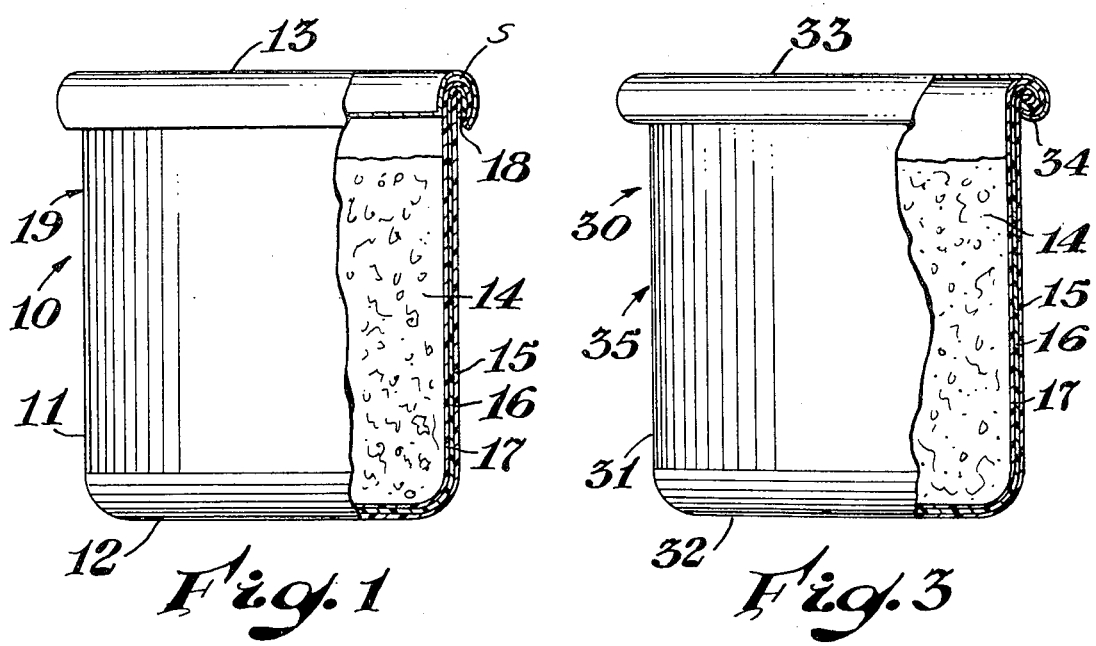
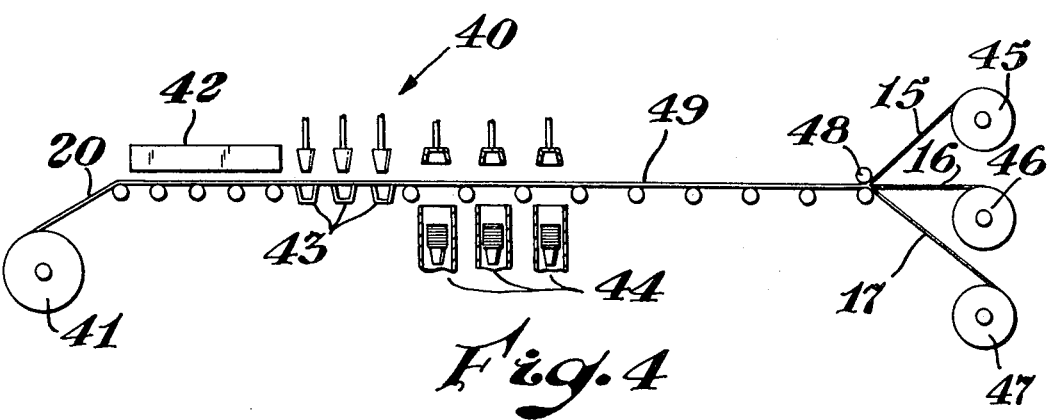
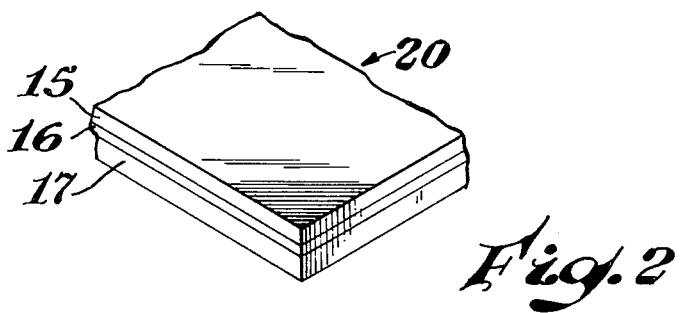

CONTAINER FOR FOOD PRODUCTS AND METHOD FOR MAKING SAME

This is a division of application Ser. No. 97,435, filed Nov. 6, 1970 and now abandoned.

BACKGROUND OF THE INVENTION

1. Field of the Invention.

This invention relates to a rigid plastic container for food products and a method of making the container, with particular reference to a container having a body thermoformed from a sheet comprising a plurality of discreet layers which are held together in a contiguous structure without being securely bonded together, and therefore are insufficient to provide mutual reinforcement, said layers of the container body functionally secured in place after filling by an interlocking closure.

2. Description of the Prior Art:

In general, the packaging of many food products require a container having a high degree of protection from gas and/or water vapor permeation into or out of the container. For example, the packaging of a food product containing a high percentage of oils requires a container which is a good barrier to oxygen penetration since the oxygen will combine with oils to cause an off taste and rancidity. Other food products such as those high in starch and sugar content require a container which will prevent the pick up of water during storage. Containers having excellent gas and/or water vapor barrier characteristics are useful for the packaging of dry food stuffs which must be kept low in water content as, for example, dry soups, gravy mixes, and powdered sugar, or foods that require that a water content be maintained such as condensed soups, canned fruits and vegetables, or foods which must be kept free from oxygen such as meat products or other like foods containing oils and fats.

Since the price of metal cans over the past few years has continued to increase while the price of many plastic materials has decreased, there is an increasing demand by the food packaging industry for a relatively inexpensive plastic container which will provide excellent oxygen and water vapor barrier properties and will permit heat sterilization of canned foods without container failure. Although many rigid plastic food containers are known and are being used, the development of containers having excellent oxygen and water vapor barrier properties which will survive retort temperatures is a relatively recent development.

Containers exhibiting excellent gas and water vapor properties preferably have bodies comprising multilayered thermoplastic side and bottom walls. Typical illustrations of such containers are described in an application Ser. No. 12,036, filed on Feb. 17, 1970 and entitled "Packaging of Food Products" by Laddie M. Thomka and assigned to same assignee as the present invention. This application discloses the practical concept of a container having a body comprising a plurality of thermoplastic layers which will provide excellent gas and/or water vapor barrier properties and will withstand retort temperatures. In the specific embodiment of this application the layers forming the container body are secured together with adhesive layers and therefore provide mutual layer reinforcement for the container. As a result, a problem occurs during the container body thermoforming process in that the considerable scrap generated cannot be or is difficult to recycle, particularly since the various layers normally have incompatible thermoplastic resin compositions.

SUMMARY

In general, the present invention resides in a rigid plastic container having a hollow body with side and bottom walls comprising a plurality of layers of different materials. The container body may be entirely composed of thermoplastic layers or thermoplastic layers may be used in combination with one or more metal layers. The body of the container can be constructed so that one or more layers provide the strength and rigidity needed while other layers provide water vapor and/or gas barrier properties. Proper composition selection of the layers can also render the containers retortable for sterilization of the foods packaged therein. Although the closure of the container is herein disclosed as being formed of metal, it might also be formed from non-metallic materials, such as certain plastic materials, which have sufficient structural and barrier properties to accomplish substantially the same function as the metal closure.

It has been found that it is unnecessary for the functional layers of the container body to be securely bonded together. The layers need only be held together in a contiguous structure until they have been formed into a container body and subsequently filled with the food product. Thereafter the functional integrity of the container is maintained by attaching an interlocking closure onto the container body which will prevent the separation of the layers along the upper peripheral edge thereof. If a properly designed container in accordance with this invention is prepared, it can be retorted with the food therein to give the container an extended shelf-life without resorting to refrigeration.

The present invention contemplates a multilayered container body, of which one or more layers are comprised of a tough relatively rigid material which will provide structural strength for the container body and will additionally provide high water vapor barrier properties such as can be found in a resin having a chief component of an olefinic polymer or copolymer. One or more other layers are included which comprise a material having high oxygen barrier properties such as saran, nylon, polyacrylonitrile or unplasticized polyvinyl chloride. The selection of the various compositions forming the layers making up the container body not only provides the proper strength and barrier properties, but can also provide low taste and odor properties for the food product contact layer and a high scuff resistance for the outer layer. Functional changes can be accomplished by interchanging the position of the various layers and/or by adding layers, keeping in mind that the gas barrier layer would best be other than the outer layer. The inner and outer layers can also be colored, for example, the inside could be white and clean appearing and the outside a decorative color.

It is understood that a wide variety of gas barrier layer thermoplastic compositions may be employed in containers constructed in accordance with the present invention. Particularly suited as gas barrier layers are combinations of vinylidene chloride polymers, vinyl chloride polymers, vinylidene fluoride polymers, acrylonitrile polymers, amide polymers and copolymers thereof which form extrudable compositions. Especially advantageous and beneficial are compositions of vinylidene chloride polymers, wherein the compositions contain at least about 70 weight percent vinylidene chloride with the remainder being one or more olefinically unsaturated monomers copolymerizable therewith. Suitable vinylidene chloride compositions are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid, methyl alpha-chloro-acrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide, or monoalkyl substitution product thereof, phenyl vinyl ketone, diethyl fumarate, diethyl maleate, methylene diethyl maleate, dichlorovinylidene fluoride, dimethyl itaconate, diethyl itaconate, dibutyl itaconate, vinyl pyridine, maleic anhydride and allyl glycidyl ether. Commercially available light and heat stabilizers may also be incorporated in the compositions such as tertiarybutyl salol and tetrasodium pyrophosphate, respectively. It is also frequently advantageous and beneficial to incorporate therein a minor portion of a plasticizer, but care should be taken not to add an excess which will substantially reduce the barrier properties of the compositions. Other barrier compositions which may be used with benefit in accordance with the present invention are vinyl chloride polymers which contain a predominant amount of vinyl chloride therein. Fluorocarbon polymers, fluorohydrocarbon polymers and fluorohalohydrocarbon polymers may also be used with benefit. Such materials as polyvinyl chloride, polyvinylidene fluoride, chlorinated polyethylene and compositions of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene vinylidene fluoride and tetrafluoroethylene and the like might also be useful. Generally, for economic reasons, the vinylidene chloride polymers are employed, as they are most readily available at a low cost.

The terms "high" or "excellent" gas and/or water vapor barrier properties as used herein are related to the functional requirements of the final container and food product packaged therein. Generally, a gas barrier having a transmission rate of about 10 cubic centimeters or less per mil of thickness per 100 square inches for 24 hours at atmospheric pressure and average room temperature and a water vapor barrier layer having a transmission rate of about 1.0 gram or less per mil of thickness per 100 square inches for 24 hours at atmospheric pressure and 95% relative humidity is satisfactory.

A plurality of theroplastic layers can be initially coextruded, or otherwise formed and thereafter brought together to make the structure from which the container body of the present invention is thermoformed. The total thickness of the structure can vary over a wide range depending on the requirements of the final container. In like manner, the individual thermoplastic layers can vary in thickness over a wide range depending on the required contributions of each layer. As a practical limit, however, the layer or layers providing structural strength and water vapor barrier properties will usually have a thickness range from about 10 mils to about 60 mils and the layer or layers providing gas barrier properties will have a thickness range from about 1 mil to about 35 mils.

In the thermoforming operation of the container body, conventional thermoforming equipment can be utilized. However, the thermoforming operation itself varies substantially from the prior art in that after the container body has been removed from the original sheet of thermoplastic layers, the remaining scrap sheet can be separated into its individual thermoplastic layers. Since the scrap sheet can be separated by layers it is possible to recycle the various layer compositions back into their original sheet forming components. The separating and recycle steps result in a significant economic advantage because as much as 60 percent scrap is generated during the thermoforming operation and the compositions of the thermoplastic layers generally employed in the container body are incompatible. Scrap sheet recycling in the past was impossible due to the belief that the layers had to be securely bonded together.

The economic advantage of plastic materials and the appeal of plastic containers to consumers are important contributions of the invention. Additional benefits are those of cleanliness in that there is no rust as attributed to metal cans and elimination of permanent denting which is common in metal cans.

Accordingly, it is a primary objective of the present invention to provide a relatively rigid plastic container for food products which not only has high moisture and gas barrier properties but is retortable and thus can achieve an extended shelf life without refrigeration. It is a further object of the present invention to provide a container which has a body portion formed from a sheet comprising a plurality of thermoplastic layers which are not securely bonded together, said plastic layers being held firmly in place after forming of the container body and subsequent filling with a food product by an interlocking closure. It is a still further object of the present invention to provide a container body thermoforming process wherein the remains of several thermoplastic layers of the sheet used to form the container body can be separated and recycled back into their related original sheet forming components.

BRIEF DESCRIPTION OF THE DRAWING

Other objects and advantages of the present invention are even more apparent when taken in conjunction with the accompanying drawing in which like characters of reference designate corresponding material and parts throughout the several views thereof, in which:

FIG. 1 is a side elevation view, with portions broken away and greatly enlarged, of a rigid plastic container for food products constructed according to the principles of the present invention;

FIG. 2 is a greatly enlarged isometric view of the multilayer sheet structure from which the container bodies of FIG. 1 and FIG. 3 are thermoformed;

FIG. 3 is a view like FIG. 1 only with a modified container means; and

FIG. 4 is a schematic representation of an apparatus used to form the container bodies of FIGS. 1 and 3, and to separate the remaining scrap sheet into its various layers.

DESCRIPTION OF THE PREFERRED EMBODIMENTS

The following description illustrates the manner in which the principles of the invention are applied but are not to be construed as limiting the scope of the invention.

More specifically, container 10, shown in FIG. 1, is generally rigid and can be briefly described here as having a 15 ounce capacity cup shaped thermoplastic body or tub 19 with a side wall 11 and bottom wall 12, and a seamed interlocking closure or lid 13 which is formed of metal. After the container body 19 is filled with the food product 14, the closure 13 is crimped closed on the container body 19, along the upper downwardly directed peripheral edge 18 thereof. The closure 13 should be even with or extend beyond the peripheral edge 18 in order to prevent the separation of the thermoplastic layers 15, 16 and 17 of the side wall 11. Also, to insure a good seal between the container body 19 and closure 13, a suitable sealant S may be used as shown in FIG. 1.

The container body 19 is thermoformed from an original sheet 20 having layers 15, 16 and 17, shown in FIG. 2. Sheet 20 is formed by the co-extrusion of the thermoplastic layers 15, 16 and 17. The co-extrusion of thermoplastic structures is well known in the art as is illustrated by U.S. Pat. No. 3,524,795.

In a specific embodiment, the two outer layers 15 and 17 of sheet 20 are each 26.5 mils thick and are continuous coherent layers of a polymer consisting essentially of polyethylene made by Ziegler catalysis which has a density of 0.959, a melt index of 0.5 and a fluxual modulous of 170,000. The core layer 16 of sheet 20 is 4 mils thick and is a continuous coherent layer of a polymer comprising 96 parts by weight of a copolymer of 85 weight percent vinylidene chloride and 15 weight percent vinyl chloride, 3 parts by weight of a copolymer of 67 weight percent ethylene and 33 weight percent vinyl acetate having a melt index of 22–28 and a density at 23°C. of 0.957 and 1 part by weight of tetrasodium pyrophosphate.

After thermoforming the container body 19 from sheet 20, the side wall 11 and bottom wall 12 have a total thickness ranging from about 20 to about 40 mils. Also after forming the container body 19, the thermoplastic layers 15, 16 and 17 are each reduced on thickness as a direct proportion of the overall reduction in total thickness of the side wall 11 and bottom wall 12. Thus, layers 15 and 17 have a formed thickness ranging from about 9.3 mils to about 18.6 mils and layer 16 has a formed thickness ranging from about 1.4 to about 2.8 mils.

The composition of layer 17 provides a low taste and odor material and is herein used as a food product contact layer. Also, the composition forming both layers 15 and 17 provides structural support for container body 19 and additionally provides a high water vapor barrier. The composition of the core layer 16 provides a high oxygen barrier.

The polymer compositions of the outer layers 15 and 17, and core layer 16 are incompatible, i.e., substantially not heat sealable. Therefore, the co-extrusion of layers 15, 16 and 17 into sheet 20 forms a structure which is held together in a contiguous structure without being securely bonded together. The bond strength between layers 15 and 17, and layer 16 after co-extrusion into sheet 20 is about 0.5 pounds per inch or less when peeled at 180° with a rate of 12 inches per minutes.

A modified container 30 with a capacity of about 15 ounces having a container body 35 comprising a side wall 31 and a bottom wall 32 and a double seamed interlocking closure 33 is illustrated in FIG. 3. The side wall 31 and bottom wall 32 of the container body 35 is comprised of the same basic layers 15, 16 and 17 as the side wall 11 and bottom wall 12 of the container body 19 shown in FIG. 1. Also the food product 14 in the container body 35 is the same as that shown in the container body 19 of FIG. 1. The modification of container 30 is exhibited by the double seamed closure 33 and the means of attaching the closure 33 to the container body 35, shown at 34. Closure 33 is curled downwardly, inwardly and upwardly around the upper peripheral edge of the container body 35. The attachment of the closure 33 to the container body 35 in the manner shown at 34 is sufficient to prevent any leaking of the container 30 at the point of attachment and will also prevent the separation of layers 15, 16 and 17, at the upper peripheral edge of side wall 31.

It has determined that containers like containers 10 and 30 with an overall container body wall thickness ranging from about 20 to about 40 mils have the following average oxygen and water vapor transmission rates:

| For | Rate per 24 Hours |
| --- | --- |
| Oxygen | 0.02 cubic centimeters per 100 square inches at atmospheric pressure and average room temperature. |
| Water vapor | 0.004 grams per 100 square inches at atmospheric pressure and 95% relative humidity. |

Containers like containers 10 and 30 of FIGS. 1 and 3 were filled with corn beef hash and chili. The containers were then retorted from temperatures of about 235°F. to about 250°F. for periods of from about 85 to 120 minutes. These sample containers were stored under various conditions and have performed satisfactorily.

Referring now to FIG. 4, apparatus 40 illustrates the general type of equipment which is useful in thermoforming the container bodies 19 and 35 as may typically be found in U.S. Pat. No. 3,350,744. In a conventional thermoforming operation, a roll of sheet 20 is placed on an unwind stand 41. Thereafter, sheet 20 passes through a heating zone 42, a forming zone 43 where the container bodies are vacuum formed with a plug assist, and a trimming zone 44 where the container bodies 19 and 35 are trimmed from sheet 20. From this point on, the method of handling the remaining scrap sheet 49 varies substantially from the prior art. Because the individual thermoplastic layers 15, 16 and 17 making up the scrap sheet 49 are not securely bonded together, they can be easily separated into their individual layers as shown at 48. After the thermoplastic layers 15, 16 and 17 have been separated, they are formed into individual scrap layer rolls on windups 45, 46 and 47. Thereafter, the individual layer scrap rolls are reclaimed by recycling into their related component compositions of sheet 20.

It is to be understood that the scope of this invention is not limited by the technique of forming the sheet comprising the plurality of thermoplastic layers used to form the container bodies of the present invention. It is also to be understood that the scope of this invention is not limited by the use of thermoplastic layers or a closure which have specific compositions or structures, but that any suitable combination thereof which will provide a relatively rigid container for food products which has high gas and water vapor barrier properties and which is retortable can be used. It is further to be understood that the scope of this invention is not limited by the thickness of the various thermoplastic layers. Thus while certain representative embodiments and details have been shown for the purpose of illustrating the invention, it will be apparent to those skilled in the art that various changes and modifications can be made therein without departing from the spirit and the scope of the invention.

What is claimed is:

1. A method of making a food product container comprising:
   a. forming a rigid container body having side and bottom walls from a portion of an original sheet comprising a plurality of layers of substantially incompatible materials which are held together in a contiguous structure without being securely bonded together, at least one layer providing structural support and at least one other layer providing high gas and water vapor barrier properties for said body;
   b. separating remaining portions of said sheet after said body has been formed and removed from said original sheet into individual layers of scrap that can be recycled to form other said layers;
   c. substantially filling said container body with a food product; and
   d. sealably securing a closure to an upper peripheral edge of said container body by mechanically interlocking peripheral portions of said layers to hold them together.

2. The method of claim 1 wherein said sheet is formed by co-extruding substantially incompatible polymers.

3. The method of claim 1 wherein said other layer is a continuous coherent layer of a polymer consisting essentially of at least 70 weight percent vinylidene chloride and at least one other olefinically unsaturated monomer copolymerizable therewith.

4. The method of claim 1 wherein said other layer is a continuous coherent layer of a polymer consisting essentially of polyamide.

5. The method of claim 1 wherein said other layer is a continuous coherent layer of a polymer consisting essentially of polyacrylonitrile.

6. The method of claim 1 wherein said other layer is a continuous coherent layer of a polymer consisting essentially of polyvinyl chloride.

7. The method of claim 1 wherein said closure is seamed to prevent said layers of said body from separating.

8. The method of claim 1 wherein said one layer also provides a high water vapor barrier.

9. The method of claim 8 wherein said one layer is a continuous coherent layer of a polymer consisting essentially of polyethylene.

* * * * *